PHONOGRAPH RECORD ENVELOPE

Filed Nov. 5, 1968

INVENTOR.
EDWARD R. NUNES
BY Townsend and Townsend
ATTORNEYS

United States Patent Office 3,473,653
Patented Oct. 21, 1969

3,473,653
PHONOGRAPH RECORD ENVELOPE

Edward R. Nunes, San Francisco, Calif., assignor to Nunes, Inc., San Francisco, Calif., a corporation of California Filed Nov. 5, 1968, Ser. No. 773,550
Int. Cl. B65d *85/58*
U.S. Cl. 206—62 4 Claims

ABSTRACT OF THE DISCLOSURE

An envelope for phonograph records formed of laminated, two-ply material. The outer lamina is suitable for receiving thereon printing or lithographing; the inner lamina is absorbent and is saturated with detergents, anti-static electricity solution, dust repelling solution, and like record conditioning substances.

This invention relates to an envelope for containing a phonograph record and more particularly to such envelope formed of special laminated paper stock that is absorbent with respect to substances that maintain the record in good condition. Only the inner lamina is saturated with such substances.

Because phonograph records, and particularly high fidelity records, are subject to rapid deterioration if played when in a dusty condition, the quality and longevity of the record is maintained only if the record is maintained free of dust. This is usually achieved by cleaning the record each time before it is played. Such frequent cleaning of phonograph records is necessary because the plastic material of which the records are made readily generates and stores static electricity, which static electricity attracts and holds dust particles to the records. One of the causes of static electricity on records is rubbing action of the record on the paper envelope that is usually employed to protect records from the rough chipboard material of which record jackets are made.

Such rubbing action is inevitable and the present invention exploits it to effect cleaning of the record and application of anti-static treatment to the record each time it is removed from or inserted into the envelope. According to the present invention, the envelope is formed of laminated paper having two laminae; the inner lamina is formed of soft absorbent paper saturated with suitable record-treating solutions, or cork, and the outside lamina is formed of paper (e.g., offset book paper) that can be printed or lithographed by conventional techniques. The laminae are coterminous to minimize cost of fabrication and to assure that the entire record surface is subjected to treatment each time the record is removed from or inserted into the envelope.

A feature and advantage of the present invention is that it maintains phonograph records in a clean condition without any extra attention by the user of the record, since the cleaning takes place during the normal removal from or insertion into the record envelope.

Other objects, features and advantages of the present invention will become more apparent after referring to the following specification and accompanying drawing in which.

Figure 1:
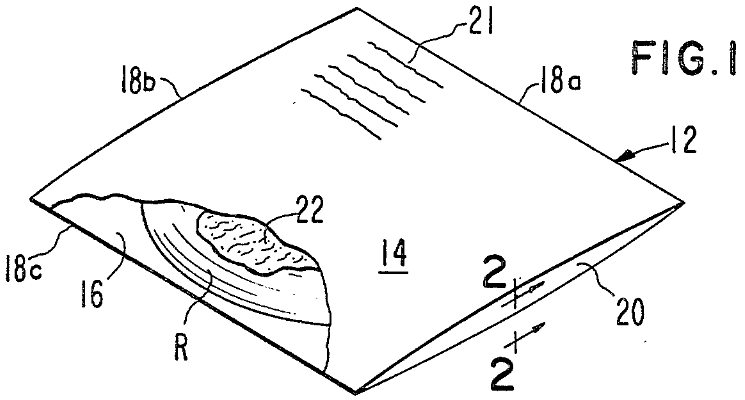
FIG. 1 is a perspective view of a record envelope embodying the present invention, parts being broken away to reveal otherwise obscure details.
Figure 2:
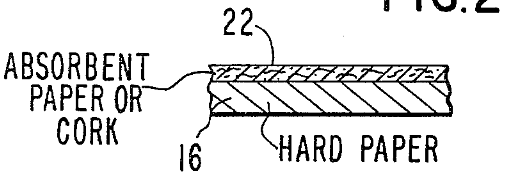
FIG. 2 is a cross-sectional fragmentary view at greatly enlarged scale taken along line 2—2 of FIG. 1.

Referring more particularly to the drawing, reference numeral 12 indicates a record envelope of the type typically enveloping a record R and fitting into a record jacket (not shown) of relatively stiff cardboard or chipboard. The envelope is formed by a front sheet 14 and a rear sheet 16. The front and rear sheets are joined to one another at three sides 18*a*, 18*b* and 18*c*, and are opened at a fourth side 20 to permit insertion and removal of the phonograph record into envelope 12. Front sheet 14 and rear sheet 16 are typically formed of paper that is suitable to receive thereon printing or lithographing 21 so that information concerning the materials on the record or the artist performing the material on the record can be included. It is common experience that such paper, when record R is rubbed against it, generates in the record static electricity which attracts to the record particles of dust and the like. The presence of dust particles on the record adversely affects the fidelity of the record and causes the record to wear prematurely.

Laminated to the inner faces of front sheet 14 and rear sheet 16 is a lamina of absorbent paper 22 which is saturated with record conditioning substances that include detergents, anti-static electricity solutions, and dust repelling substances. The specific characteristics and properties of such substances are so well understood by phonograph record users and others skilled in the art that further details regarding them are unnecessary. The saturated absorbent sheet 22 is laminated to the interior surface of sheets 14 and 16 throughout their entire area so that the entire areas of both sides of record R are contacted by sheet 22 when the record is in the envelope. Thus, when record R is removed from envelope 12, both sides have been treated by the substances so the record is clean and ready for playing. On completion of playing of the record, its reinsertion in envelope 12 will clean the faces of the record again and will protect the record until it is again ready to be played.

Although the saturated condition of the lamina 22 subsists for a long period of time because the envelope is normally enclosed in an outer record jacket, the envelopes according to the present invention are so inexpensive that it is economically feasible for the record owner to purchase a number of envelopes from time to time for replacement, should the absorbent lamina 22 become dried out. Contributing to the low cost of the envelope 12 is the fact that the lamina 22 is coterminous with the inner face of sheets 14 and 16. It has been found that a lamina 22 formed by an extremely thin layer of cork, treated or untreated, is useful in maintaining record R in a dust-free condition.

Figure 3:
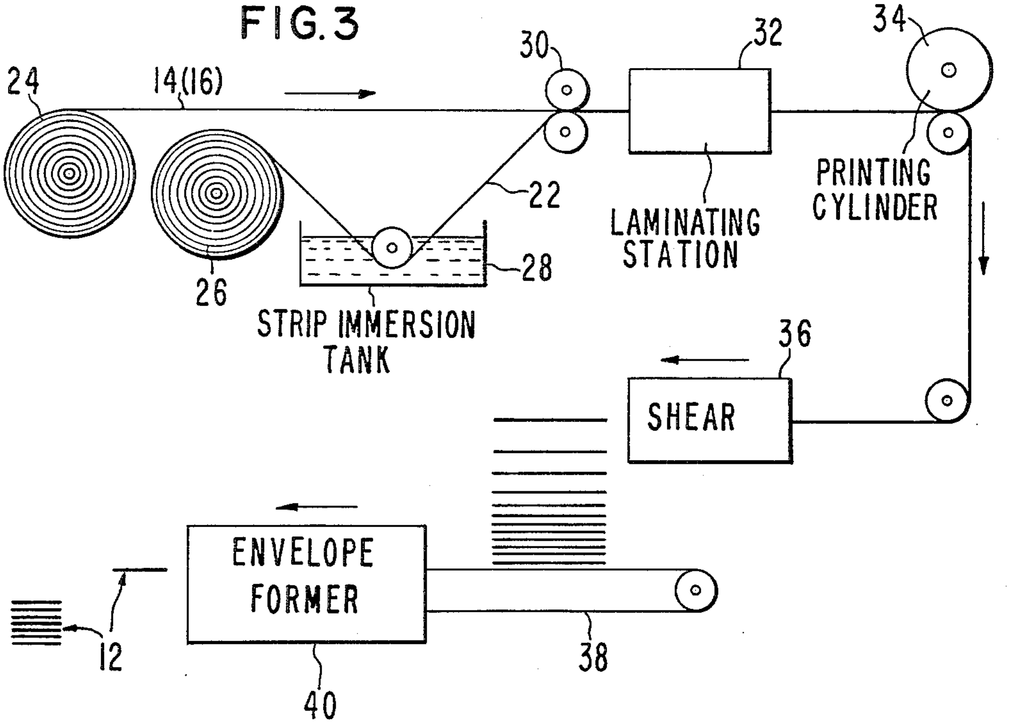
FIG. 3 is a diagrammatic sketch showing exemplary method and machinery for forming envelopes according to the present invention.

Because of the coterminous relationship between the outer sheets and inner lamina, the product can be formed by conventional treating lines. A typical strip paper treating line is shown diagrammatically in FIG. 3. Such line includes a supply roll 24 for a strip of paper of the type used for front and rear sheets 14 and 16, and a supply roll 26 of absorbent paper for lamina 22. The strip for lamina 22 is led through a treatment tank 28, in which treatment tank is placed the appropriate record treating solution for absorption into the lamina. The lamina strip 22 is then conveyed through guide rollers 30 into a laminating station 32 which includes suitable adhesive applying, compressing and drying apparatus so as to laminate absorbent lamina 22 onto paper strip 24. The laminated product is next conducted past a printing station 34 at which indicia 21 is applied, and thence to a shear 36 that cuts the strip into individual pieces or blanks that include front sheet 14 and rear sheet 16 in a flat condition. A conveyor 38 conducts the envelope blanks to an envelope former which includes folding and gluing stations of conventional form. At the output of envelope former 40 are the completed envelopes 12.

Thus it will be seen that the present invention provides in a most straightforward uncomplex manner a solution to the vexing problem of maintaining in prime condition phonograph records without requiring that the records be subjected to time-consuming washing and like treatment before and/or after each play to which the records are subjected. The salutary objects of the invention are provided in a relatively inexpensive modification to the existing form of record envelopes so that they can be conveniently provided both with new records and to owners of collections of existing records.

Although one embodiment of the invention has been shown and described, it will be obvious that other adaptations and modifications can be made without departing from the true spirit and scope of the invention.

What is claimed is:

1. An envelope for containing a record comprising a square front sheet, a rear sheet congruent with said front sheet and joined thereto around three sides, the fourth side constituting an opening for insertion and removal of a phonograph record between the sheets, the inner surface of said sheets being laminated with an absorbent paper lamina coterminous with said sheets, said absorbent lamina being saturated with a detergent solution so that when a phonograph record is inserted into and removed from the envelope the surface of the record will rub against the lamina and the detergent will effect cleaning action.

2. The invention of claim 1 including an anti-static material absorbed into said lamina.

3. The invention of claim 1 including a detergent material absorbed into said lamina.

4. The invention of claim 1 including a dust repelling material absorbed into said lamina.

References Cited

UNITED STATES PATENTS

| | | | |
|---|---|---|---|
| 3,224,593 | 12/1965 | Way | 229—68 |
| 3,317,038 | 5/1967 | Bade et al. | |

JAMES B. MARBERT, Primary Examiner

U.S. Cl. X.R.

229—68